April 14, 1931.   R. F. HILL   1,801,235
PULL ROD CLAMP
Filed March 8, 1929
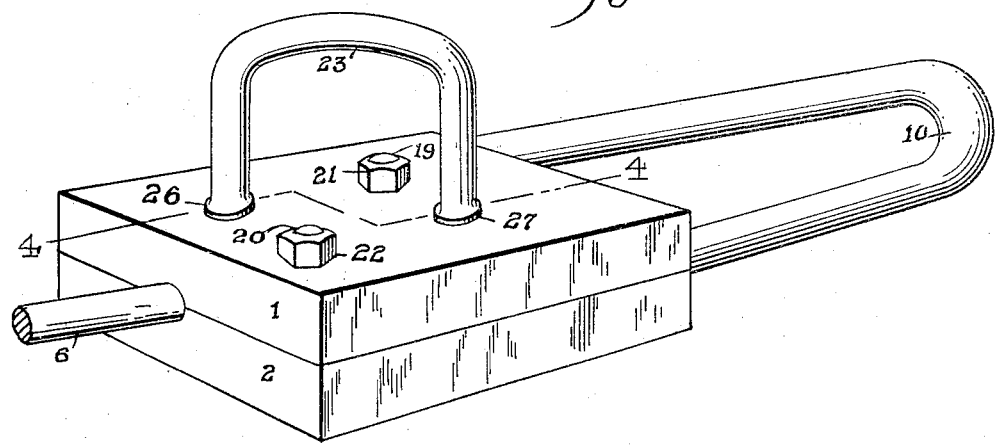
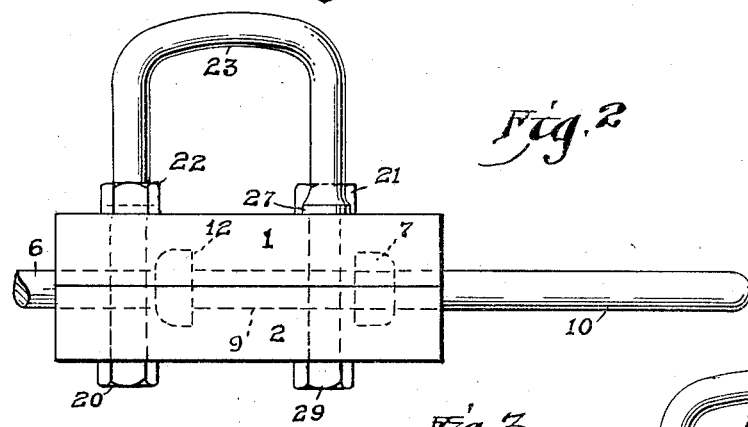
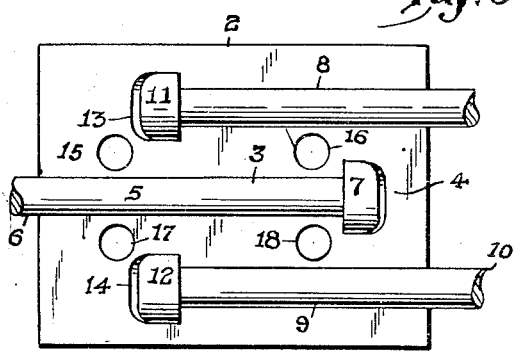
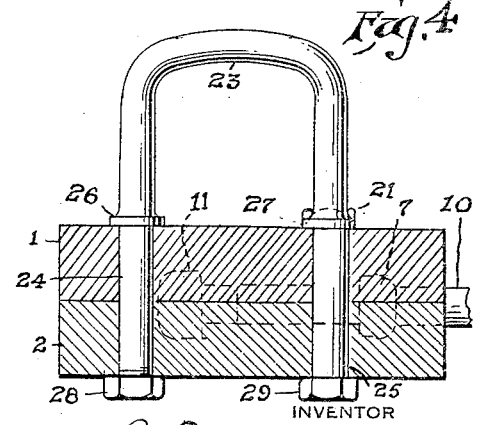
INVENTOR
R. F. Hill
by F. N. Barber
attorney Patented Apr. 14, 1931

1,801,235

UNITED STATES PATENT OFFICE

ROWLAND F. HILL, OF TOLEDO, OHIO, ASSIGNOR TO THE NATIONAL SUPPLY COMPANY, OF TOLEDO, OHIO, A CORPORATION OF OHIO

PULL-ROD CLAMP

Application filed March 8, 1929. Serial No. 345,324.

This invention relates to pull-rod clamps which securely hold one end of a pull-rod and also hold the ends of a loop to which one end of the other section of the pull rod is loosely connected. Pull-rods are rod-like connections between what are known as pumping-powers and pumping-jacks. Pull-rods, pumping-powers and pumping-jacks are well-known and need not be described.

There are occasions when it is necessary to uncouple pull-rod clamps from the pull-rods while the pumping-power is in operation. This uncoupling is a manual operation which in some cases requires the operator to grasp the pull-rod clamp, which is often a dangerous practice. It is the object of this invention to provide a handle which may be grasped by the operator without danger to his hand or fingers while he is disconnecting a clamp from a pull-rod.

Referring to the accompanying drawings, Fig. 1, is a perspective view of my invention, the pull-rod being shown in cross-section; Fig. 2, a side elevation of Fig. 1; Fig. 3, a plan view of Fig. 2 with the upper member of the clamp, the clamping bolts and the handle being omitted; and Fig. 4, a section on the line 4—4 on Fig. 1.

On the drawings, 1 and 2 designate rectangular duplicate or interchangeable clamping members. Accordingly, only one member, as shown in Fig. 3, will be fully described. One member 2 has centrally and longitudinally thereof the channel 3 and the recess 4 to receive respectively the body 5 of the pull-rod 6 and the terminal head 7 on the pull-rod. This head is preferably seated near the opposite end of the member 2 from which the pull-rod projects.

The member 2 has on opposite sides of the channel 3 channels 8 and 9 to receive the ends of the loop 10, the ends of the loop having the heads 11 and 12 seated respectively in recesses 13 and 14 in the member 2.

The channels 3, 8 and 9 and the body 5 of the pull-rod and the inner ends of the loop 10 lie in one face of the member 2, as shown in Fig. 3. The member 1 being a duplicate of the member 2 is placed upon the member 2 so that its channels and recesses will receive the body 5 of the pull-rod 6, the ends of the loop 10 and the said heads 7, 11 and 12.

Fig. 3 shows four bolt holes 15, 16, 17, and 18. When the parts described are assembled as shown in Figs. 1, 2, and 4, bolts 19 and 20 are seated in the holes 16 and 17 and the nuts 21 and 22 are applied to the bolts to clamp the members 1 and 2 together.

23 is a U-shaped member or handle having its ends 24 and 25 in the bolt holes 13 and 18. The ends 24 and 25 of the member 23 having the fixed collars or shoulders 26 and 27 resting on the outer surface of the member 1, nuts 28 and 29 being applied respectively to the ends 24 and 25 and screwed up against the outer face of the member 2 to assist the bolts 19 and 20 in holding the members 1 and 2 securely together and also to securely hold the loop and U-shaped member 23 in place. The closed end of the U-shaped member forms a handle which the operator may grasp when connecting or disconnecting the loop 10 from the pull-rod (not shown) connected thereto.

I prefer to have the handle of U-shaped member 23 connected to diagonally-opposite bolt holes, because the clamp is thereby more easily maintained in a horizontal position when supported by the handle. However, the handle could have its ends supported in any other two of the bolt holes, if desired.

I claim:

1. In a pull-rod clamp, a pair of opposed plates, pull-rod members having their ends between the opposing faces of the said plates, a U-shaped handle member having its ends in alined holes in the two members, and means applied to the said ends for clamping the plates together and the handle member to the clamp.

2. In a pull-rod clamp, a pair of opposed plates, pull-rod members having their ends betwen the opposing faces of the said plates, a U-shaped handle member having its ends in alined holes in the two members, a shoulder on each end and seated against the outer face of one plate, and clamping devices on each end seated on the outer face of the other plate.

In testimony whereof, I hereunto affix my signature.

ROWLAND F. HILL.